US012367144B2

(12) United States Patent
Kennelly et al.

(10) Patent No.: US 12,367,144 B2
(45) Date of Patent: Jul. 22, 2025

(54) CACHE CONTROL INSTRUCTIONS USING OBJECT LIFETIME INFORMATION

(71) Applicant: Google LLC, Mountain View, CA (US)

(72) Inventors: Christopher Thomas Kennelly, Croton-on-Hudson, NY (US); Xinliang David Li, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/210,730

(22) Filed: Jun. 16, 2023

(65) Prior Publication Data

US 2024/0419590 A1    Dec. 19, 2024

(51) Int. Cl.
| G06F 12/08 | (2016.01) |
| G06F 9/50 | (2006.01) |
| G06F 9/54 | (2006.01) |
| G06F 12/0806 | (2016.01) |

(52) U.S. Cl.
CPC ........ *G06F 12/0806* (2013.01); *G06F 9/5027* (2013.01); *G06F 9/544* (2013.01); *G06F 2212/62* (2013.01)

(58) Field of Classification Search
CPC ............. G06F 12/0806; G06F 12/0815; G06F 9/5027; G06F 9/544; G06F 2212/62
USPC .................................................. 711/141, 133
See application file for complete search history.

(56) References Cited

U.S. PATENT DOCUMENTS

| 5,375,216 | A | 12/1994 | Moyer et al. | |
| 6,249,845 | B1 | 6/2001 | Nunez et al. | |
| 8,490,065 | B2 | 7/2013 | Archambault et al. | |
| 9,058,272 | B1* | 6/2015 | O'Bleness | G06F 12/0831 |
| 10,365,930 | B2 | 7/2019 | Nickolls et al. | |
| 10,754,782 | B1* | 8/2020 | Pham | G06F 12/0831 |
| 11,372,769 | B1 | 6/2022 | Mittal et al. | |
| 2011/0078381 | A1* | 3/2011 | Heinrich | G06F 12/0897 711/E12.024 |
| 2013/0227224 | A1* | 8/2013 | Koinuma | G06F 11/1048 711/E12.091 |
| 2014/0281180 | A1* | 9/2014 | Tune | G06F 12/0833 711/146 |
| 2015/0254182 | A1* | 9/2015 | Asher | G06F 12/0815 711/135 |
| 2015/0254207 | A1* | 9/2015 | Kessler | G06F 13/10 710/39 |
| 2015/0378942 | A1* | 12/2015 | Bradbury | G06F 9/467 710/267 |
| 2017/0083337 | A1* | 3/2017 | Burger | G06F 9/30058 |
| 2017/0344479 | A1* | 11/2017 | Boyer | G06F 12/0817 |
| 2023/0058989 | A1* | 2/2023 | Hammarlund | G06F 13/161 |
| 2023/0091974 | A1* | 3/2023 | Gupta | G06F 12/0653 711/202 |

(Continued)

OTHER PUBLICATIONS

Extended European Search Report for Application No. 23217090.2 dated May 8, 2024, 9 pages.

*Primary Examiner* — Than Nguyen
(74) *Attorney, Agent, or Firm* — Lerner David LLP

(57) ABSTRACT

The disclosed technology provides instructions to manipulate the state of a processor's cache. An application may send an instruction directly to the processor, providing it with information about memory allocation or deallocation events occurring within the application. This direct communication facilitates immediate synchronization between the application and the processor, ensuring accurate memory management.

18 Claims, 5 Drawing Sheets

(56) References Cited

U.S. PATENT DOCUMENTS

2023/0305957 A1* 9/2023 Fetterman ........... G06F 12/0802

\* cited by examiner

400

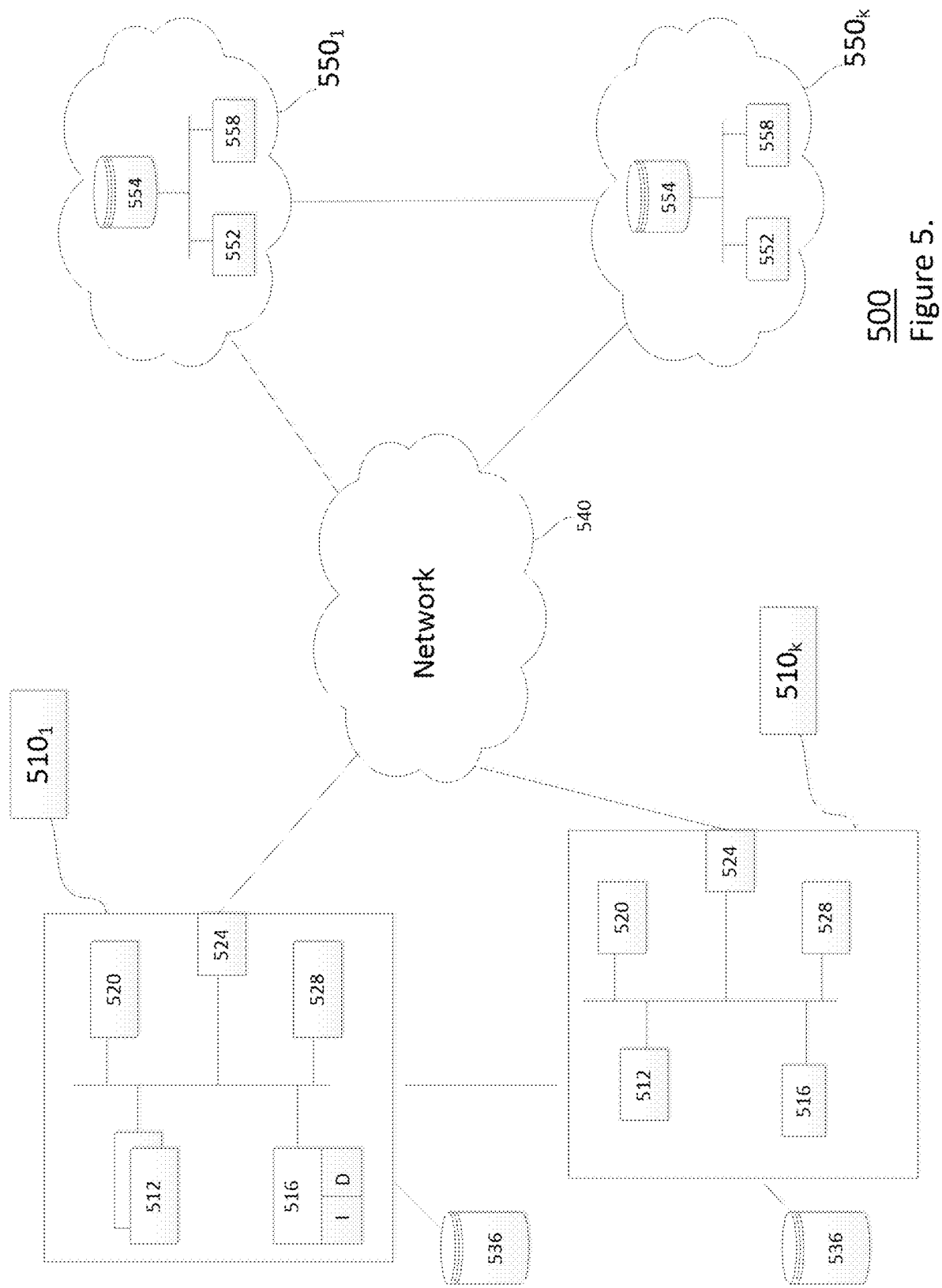

CACHE CONTROL INSTRUCTIONS USING OBJECT LIFETIME INFORMATION

BACKGROUND

Modern day data processing architectures typically employ cache memories to improve processing speed. A common design employs three levels of cache memories: (1) a last level or level 3 (last level cache (LLC) or L3) cache closest to the DRAM, (2) a level 2 (L2) cache and (3) a level 1 (L1) cache. The L2 cache sits between the L1 and L3 caches. The L3 cache is larger than the L2 cache, and the L2 cache is larger than the L1 cache. Data to be operated on by a central processing unit, processor, or core (generally a processing element) is typically fetched from L1, from L2 if there is a L1 miss, and from LLC/L3 if there is an L2 miss.

When an application requests data or instructions, the processor first looks for the data or instructions in the closest L1 cache. If the data or instructions are not found in the L1 cache, the processor sequentially accesses the L2 cache followed by the L3 caches to retrieve the data. Finally, if the data is not present in any cache level, it is fetched from the main memory and stored in the cache for future use.

The cache operates with the consideration of data reusability of an application. If an application repeatedly uses the same data, it will be stored in the cache for quick access. However, because the application data remains in the cache, the cache is often filled with stale or unnecessary data even after the application finishes executing.

SUMMARY

Aspects of the disclosed technology may include a method, apparatus or system for operating a cache within a computer system including a plurality of processors. The method may comprise receiving, at a first processor, an instruction from an application; and when the instruction is an invalidation request, marking by the first processor the state of the specific cache line as invalid and marking the cache line as a candidate for eviction; and when the instruction is a materialization request, allocating by the first processor a cache line and setting the state of the specific cache line to a zero state. In accordance with this aspect of the disclosed technology, the instruction is an invalidation request or a materialization request for a specific cache line, and the instruction is associated with a memory range of the application.

One aspect of the disclosure provides a method for operating a cache within a computer system comprising a plurality of processors, the method comprising receiving, at a first processor, an instruction from an application, wherein the instruction is an invalidation request or a materialization request for a specific cache line, and the instruction is associated with a memory range of the application. When the instruction is an invalidation request, the first processor marks the state of the specific cache line as invalid and marks the specific cache line for eviction; and when the instruction is a materialization request, the first processor allocates a cache line and sets the state of the specific cache line to a zero state.

When the state of the specific cache line is the zero state, a copy of the specific cache line in a second processor may be invalidated. In some examples, the method may further provide for identifying the state of the specific cache line, wherein identifying the state of the specific cache line further comprises reading the dirty bits of and Modified Exclusive Shared Invalid (MESI) state of the specific cache line. The invalidation request may be received from the application when an operation of the application terminates. The materialization request may be received from the application when a previous value is no longer needed. When the specific cache line with the zero state receives a snoop read request from the second processor, the method may include setting the state of the specific cache line to a zero-shared state.

According to some examples, the instruction may be executed along with a memory allocation operation. According to some examples, the instruction may follow MESI or Modified Owned Exclusive Shared Invalid (MOESI) coherence protocol. The specific cache line may be determined based on a memory access region of the application.

Another aspect of the disclosure provides a computer system, comprising a main memory, a plurality of caches operably connected to the main memory, and one or more processors operably connected to the main memory and the plurality of caches. The one or more processors may be configured to receive an instruction from an application, wherein the instruction is an invalidation request or a materialization request for a specific cache line, and the instruction is associated with a memory range of the application. When the instruction is an invalidation request, the one or more processors may mark the state of the specific cache line as invalid and may mark the specific cache line for eviction. When the instruction is a materialization request, the one or more processors may allocate a cache line and may set the state of the specific cache line to a zero state.

According to some examples, when the state of the specific cache line is the zero state, a copy of the specific cache line in a second processor is invalidated. The one or more processors may be configured to identify the state of the specific cache line, wherein identifying the state of the specific cache line further comprises reading the dirty bits and MESI state of the specific cache line.

In some examples, the invalidation request may be received from the application when an operation of the application terminates. In some examples, the materialization request may be received from the application when a previous value is no longer needed. When the specific cache line with the zero state receives a snoop read request from the second processor, the state of the specific cache line may be set to a zero-shared state.

In some examples, the instruction may be executed along with a memory allocation operation. In some examples, the instruction follows MESI or MOESI coherence protocol. The specific cache line may be determined based on a memory access region of the application. The plurality of caches may include L1 cache, L2 cache, and shared cache, interconnected by a bus.

DESCRIPTION OF THE DRAWINGS

FIG. 5 is a block diagram illustrating an example computing environment in accordance with an aspect of the disclosed technology.

DETAILED DESCRIPTION

The disclosed technology may take the form of a process, method, apparatus, or system that defines new instructions to manipulate a state of a processor's cache. The instructions may be used together with memory allocation operations when the lifetime of a memory region is defined. The disclosed technology leverages the absence of undefined behavior and improves program performance by reducing memory traffic. The disclosed technology also has the additional benefit of improved program security.

Memory may be partitioned into "size classes" to accommodate objects of the same size within these classes. This division serves to minimize the overhead associated with bookkeeping, while also enabling memory to be cached, in a logical cache implemented in software, efficiently in free lists at either the per-core or per-thread level.

Hardware processor caches are used to temporarily store a portion of memory, and when an application reads or writes data, the corresponding data is copied to the cache for faster access. However, when the application terminates its execution, the memory management system releases the memory regions used by that application and returns them to the free list.

Memory blocks included in the free list are reallocated and reused when there is an allocation request. This allows for efficient management of dynamic memory allocation and deallocation. The free list enables efficient utilization and recycling of memory, allowing other applications or processes to allocate and use that memory again.

However, memory in the free list may persist for a certain period even after it has been logically deallocated. This is determined by factors such as cache replacement policies, memory access patterns, or cache coherence. Therefore, even after the application has terminated, application data may remain in the cache.

When the length of the free list increases, indicating a higher number of objects awaiting allocation, older objects located at the tail of a LIFO (Last-In-First-Out) or the head of a FIFO (First-In-First-Out) queue might be evicted from the cache. These evicted objects are then written back to memory with their dirty bits set. This situation results in inefficient and wasteful traffic because any utilization of the freed memory, which still resides in the free list, can lead to unpredictable behavior.

Figure 1:
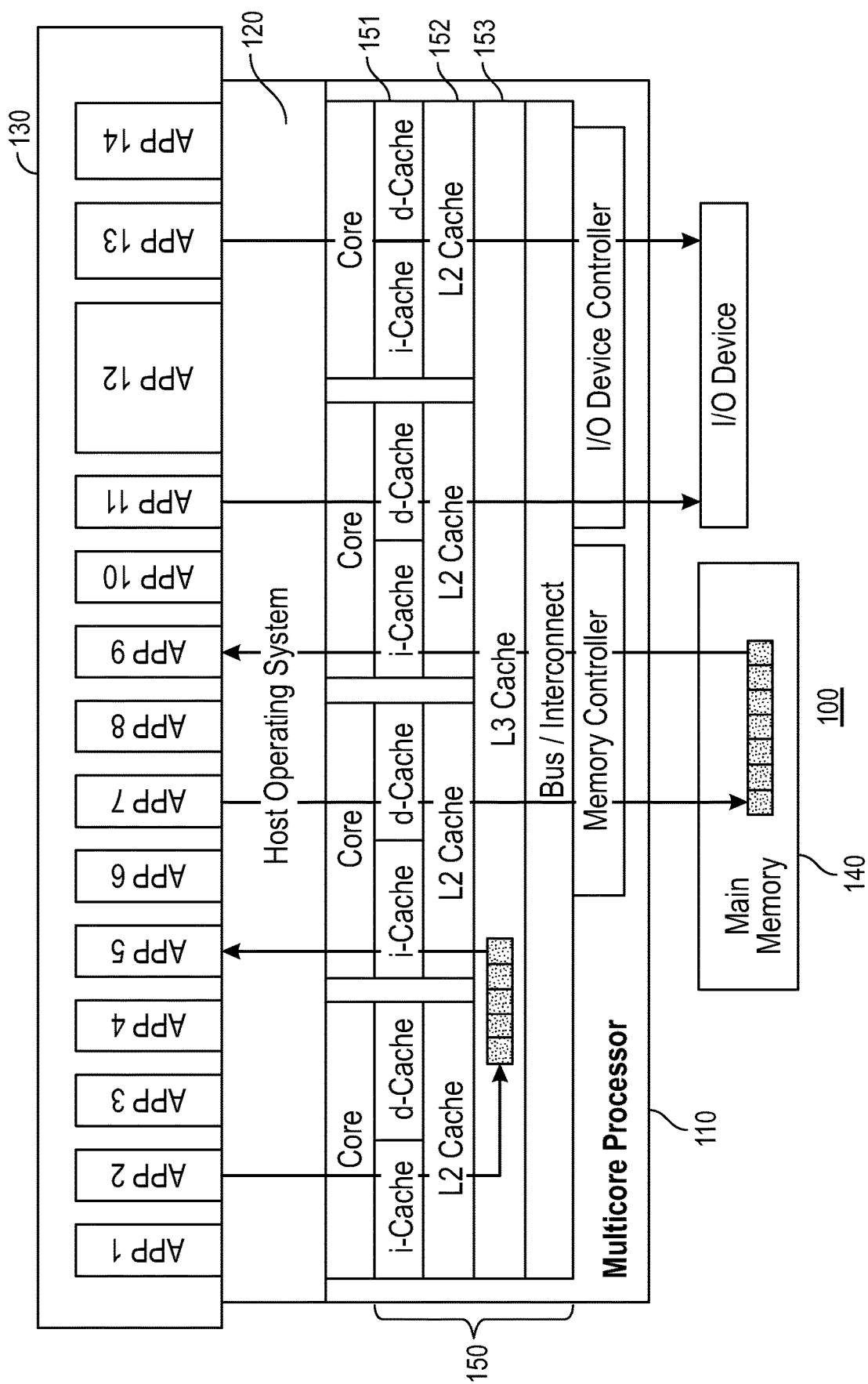
FIG. 1 shows an example hardware implementation of a multi-core hierarchy in accordance with an aspect of the disclosed technology.

The disclosed technology defines a new instruction to directly control the cache, enabling effective management of unnecessary cache lines. FIG. 1 illustrates the multicore hierarchy in a computer system 100. The multicore processor 110 of the computer system 100 can execute the operating system 120 and device drivers to provide services and/or resources to application programs 130. Processor 110 can execute application programs 130 that utilize the services and/or resources. For example, an application program implementing various types of applications in the computer system 100 can instruct the processor 110 to retrieve data from caches 150 or main memory 140.

The operating system 120 of the computer system 100 can allow application programs 130 to store or retrieve data from caches 150 or main memory 140 using virtual memory addresses. The operating system 120 maps virtual addresses to physical addresses of one or more caches 150 or main memory 140 connected to the processor 110 of the computer system 100. The operating system 120 implements memory accesses specified by virtual addresses using the physical addresses of one or more caches 150 or main memory 140.

When an application requests data or instructions, the processor 110 first looks for the date or instructions in the closest L1 cache 151. If the data or instructions are not found in the L1 cache 151, the processor sequentially accesses the L2 cache 152 followed by the L3 caches 153 to retrieve the data or instructions. Finally, if the data or instructions are not present in any cache level, the date or instructions are fetched from the main memory 140 and stored in one or more caches 150 for future use.

A specific range of memory that will be utilized is identified by an application of the applications 130, e.g., app 1. The processor 110 is notified about the memory addresses that contain data which is no longer required. The memory allocator, which can be, for example, part of the application programs 130, is responsible for managing and allocating memory within the application. The application also maintains its own bookkeeping, meaning it keeps track of the allocated and freed memory.

However, the processor 110 itself lacks awareness of the application's memory management at the hardware level. To ensure proper coordination between the application and the processor's bookkeeping, the application may update the processor when it performs memory allocation or deallocation, freeing memory. By doing so, the processor 110 can maintain an up-to-date record of allocated and freed memory, enabling it to optimize its operations and potentially reclaim memory resources.

Based on the memory region analyzed by application, the application may send an instruction directly to the processor 110, providing it with information about memory allocation or deallocation events occurring within the application. This direct communication facilitates immediate synchronization between the application and the processor 110, ensuring accurate memory management.

Figure 2:
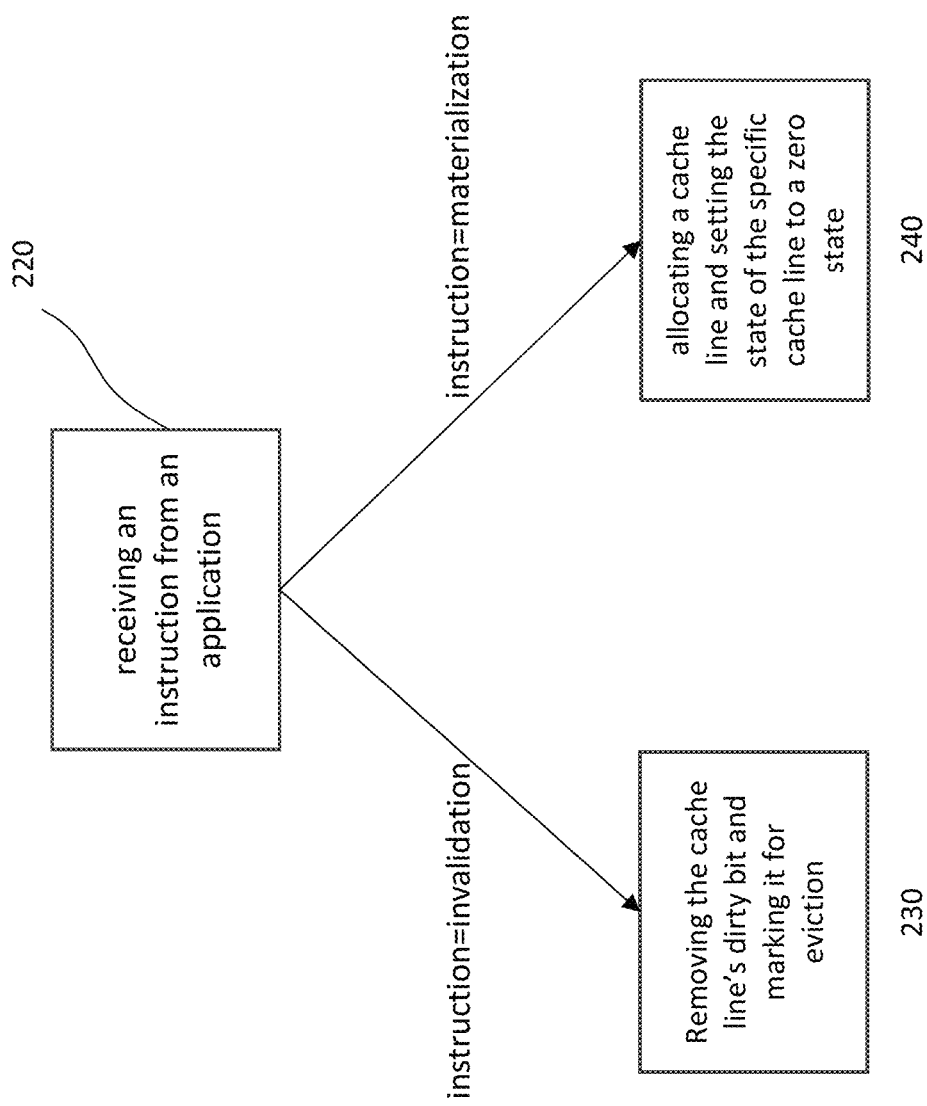
FIG. 2 is a flow diagram illustrating an example method in accordance with aspects of the disclosed technology.

FIG. 2 provides an illustrative example of a process or method 200 that incorporates various aspects of the disclosed technology. The process begins at block 220, where the processor receives an instruction from an application that is related to the memory access region of the application. This instruction specifically addresses memory allocation ("materialization") or deallocation ("invalidation") events. As the application interacts with its memory, it may send instructions to the processor indicating the need for memory allocation or deallocation within its designated memory access region. Upon receiving such an instruction, the processor responds by modifying the state of the corresponding cache line. This modification ensures that the cache aligns with the changes made by the application, maintaining consistency and efficient memory management.

Upon receiving the instruction as an invalidation, at block 230, the processor proceeds to mark the state of the cache line as invalid and make it a candidate for eviction. According to some examples, marking the state of the cache line as invalid may include removing the cache line's dirty bit. This may also be referred to as marking the state of the cache line as clean. Making the cache line a candidate for eviction may include marking it for eviction, such that it is evicted in response to a condition such as a need for free memory, or automatically evicting it. In this process, the dirty bits within the invalidated line are discarded without being written back to the lower-level cache or memory. Since there is no future need to retrieve the specific cache line, these dirty bits are not preserved. When the processor receives the instruction as a materialization, at block 240, it allocates a cache line and sets the state of that specific cache line to a zero state (Z-state). The application may send a materialization request when using memory where a previous value is no longer needed, such as when an operation of the application terminates or when a lifetime of the memory block terminates. When the memory allocator allocates the memory block, it may send the materialization request conditionally. The condition may be the size of the allocated memory. When the size is large, eagerly materializing all cache blocks may result in false demand—evicting other useful cache blocks from the cache. In such cases, cache blocks may be allocated lazily when the memory is actually accessed later. The application may send a materialization request when using memory where a previous value is no longer needed. This allocation ensures that the cache line is available and ready for use, while the actual physical zero initialization of the cache block is not necessary, where physical refers to writing to DRAM rather than being in the processor's cache. Once the cache line enters the Z-state, copies of the cache line in other cores are invalidated, maintaining coherence and consistency across the system.

Figure 3:
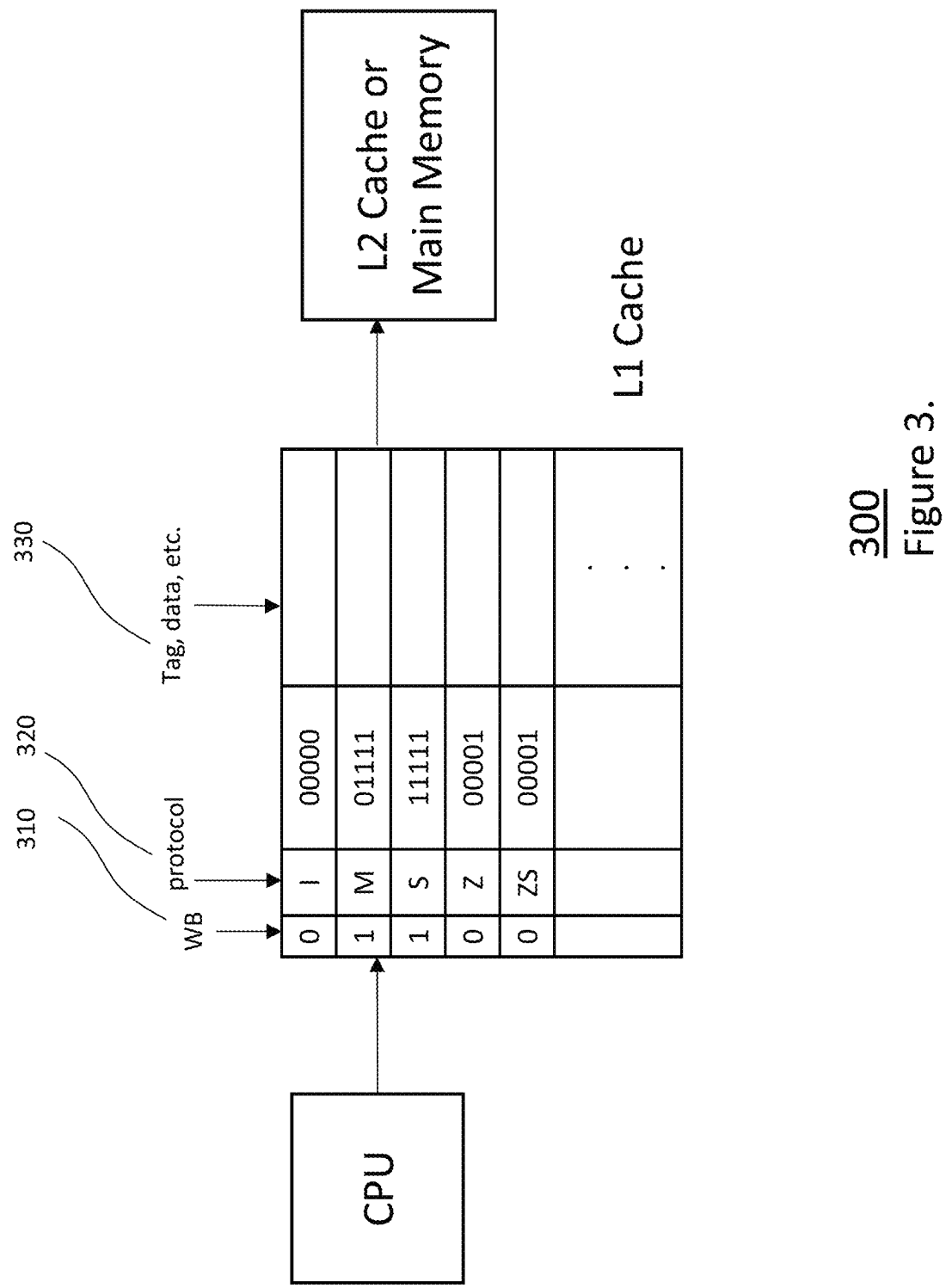
FIG. 3 shows an example implementation of a mechanism for determining whether to retain or overwrite data in a cache in accordance with an aspect of the disclosed technology.

FIG. 3 provides an illustration of a cache line within the L1 cache 300. Each cache line in the L1 cache, as depicted in the figure, comprises a written-back field 310, a protocol field 320 (e.g., MESI, cache coherence protocol (CHP), etc.), and a data field 330. As mentioned above, the dirty bit is typically a WB field 310 and a single bit that accompanies each cache line and indicates whether the data in the cache line has been modified (or "dirtied") since it was last loaded from or written to the main memory. When a cache line is loaded from memory into the cache, the dirty bit is typically set to 0, indicating that the data in the cache line matches the data in the main memory. However, if the processor modifies the data within the cache line, the dirty bit is set to 1 to indicate that the cache line now holds a different version of the data compared to the main memory. In this case, the cache controller writes the contents of the cache line back to the main memory, ensuring that the changes made in the cache are synchronized with the main memory.

The protocol field 320 consists of bits that represent the state of the cache line, and this state changes whenever there is a modification to the cache data. Following the MESI cache coherence protocol, the Modified (M) state signifies that the data has been modified, it means that the cache holds a copy of the data that has been modified, and this copy is different from the data in the main memory. The Invalid (I) state indicates that the data is no longer valid. When a cache line is in the Invalid state, it means that the cache line is not valid or does not contain any useful data. This state occurs when a cache line is not present in the cache or has been intentionally invalidated. If a cache wants to access an invalid cache line, it may retrieve the updated data from the main memory or another cache. The Shared(S) state indicates that multiple caches hold a copy of the same cache line, and the data is consistent among all the caches. In this state, the data can be read by any cache without causing coherence conflicts. In the Exclusive state, a cache line is held exclusively by a single cache, and no other cache has a copy of the same cache line.

As mentioned above, upon receiving instructions, the processor responds by modifying the state of the corresponding cache line. When the processor receives a materialization instruction from the application, an additional Zero (Z) state is added to the existing MESI states. In this case, although the MESI bits in the cache line are represented as Z, there is no need to physically zero out the cache block itself. Additionally, in cases where instructions related to data requests between cores may arise, a new state called the Zero-Shared (ZS) state can be introduced within the modified protocol. Therefore, the modified protocol can accommodate the addition of new states based on the occurrence of specific instructions associated with cache data invalidation and materialization.

Table 1 represents a list of example instructions that may be applicable to a specific cache line. The processor can receive Read/Write requests for a particular cache line, as mentioned earlier, and can perform Invalidation and Materialization requests.

TABLE 1

Processor Core Operations

| Operation Name | Description |
|---|---|
| Read | The read request to the cache line from the core |
| Write | The write request to the cache line from the core |
| INV | The invalidation request to the cache line |
| MAT | The materialization request to the cache line |

Table 2 provides a list of example Snoop requests that may be exchanged between a plurality of caches for achieving coherence.

TABLE 2

Snoop Requests/Bus Operations

| Operation Name | Description |
|---|---|
| SNPRead | A snoop request for read from another core |
| SNPRFO | A snoop request for read from other core which is writing the cache line but does not own it |
| SNPWrite | A snoop request indicating another core is updating/modifying the copy of the cache line |
| SNPDrain | A snoop request/message to indicate the dirty bits of the cache line is written back to the memory |
| SNPDrainAndCopy | Similar to the above, but the cache block is also posted on the bus (for cache-cache copy) |

Table 3 presents the states of cache lines when Invalidation and Materialization are applied. While following the MESI coherence protocol, it is evident that new states such as Zero state and Zero-shared state have been introduced.

TABLE 3

Cache Line States

| Current State | Operation Type | New State | Transactions |
|---|---|---|---|
| M | INV | Z | Dirty bits discarded |
| E | INV | Z | None |
| S | INV | ZS | None |
| I | INV | I | None |
| M | MAT | Z | Dirty bits discarded |
| E | MAT | Z | None |
| S | MAT | Z | SNPWrite (to invalidate copies in other cores) |
| I | MAT | Z | SNPWrite (to invalidate cache lines in other cores) |
| Z | INV | Z | None |
| ZS | INV | ZS | None |
| Z | MAT | Z | None |
| ZS | MAT | Z | SNPWrite (to invalidate lines in other cores) |
| Z | Read | Z | None |
| ZS | Read | ZS | None |
| Z | Write | M | None |
| ZS | Write | M | SNPWrite |

TABLE 3-continued

Cache Line States

| Current State | Operation Type | New State | Transactions |
|---|---|---|---|
| Z | SNPRead | ZS | broadcast zeros on bus |
| ZS | SNPRead | ZS | may broadcast zeros |
| Z | SNPRFO | I | None |
| ZS | SNPRFO | I | None |
| Z | SNPWrite | N/A | N/A |
| ZS | SNPWrite | I | None |

Figure 4:
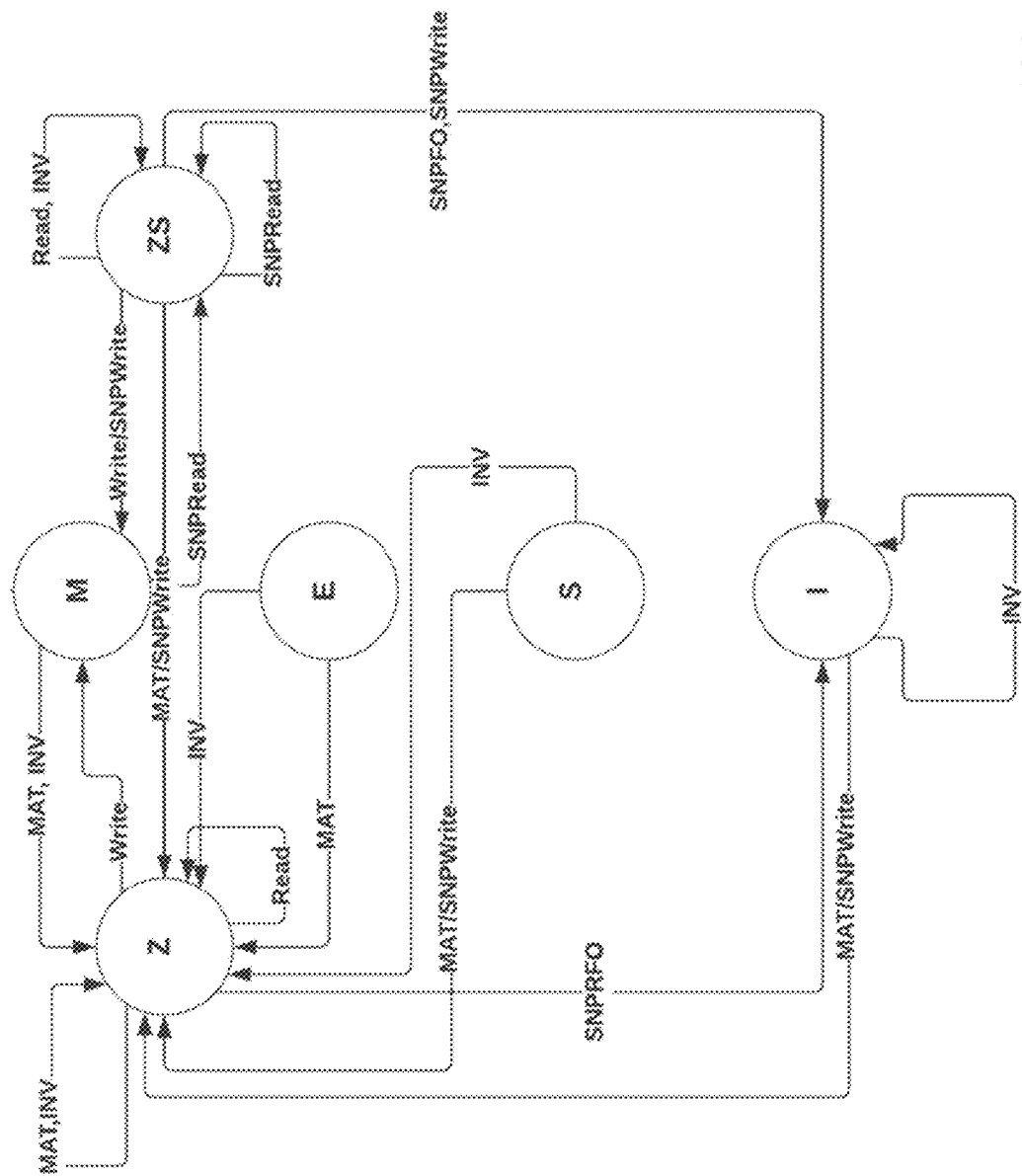
FIG. 4 is a state diagram illustrating a transition of cache lines in accordance with an aspect of the disclosed technology.

FIG. 4 illustrates example state transition of cache lines. Upon receiving an instruction from the application, the processor identifies the state of the respective cache line and modifies it accordingly. In the event of an invalidation request, the cache line's state is changed to Invalidation, subsequently leading to its eviction from the cache. For example, as a result of the invalidation request, dirty bits from the cache line may be dropped, such as by changing M/S/E to Z/ZS state, and remains INV state if current state is INV. Moreover, the cacheline may be marked as a candidate for eviction, such that eviction occurs when space is needed. Such marking may be handled by the cache controller. In the case of the cache line currently being in the Modified (M) state, the WB (Write-Back) field is discarded.

In the scenario where the processor receives a materialization request to the corresponding cache line from the application, the state of the corresponding cache line is altered to the Zero (Z) state. If the cache line is currently in the Modified (M) state, the WB field is discarded, and the cache line is transitioned to the Zero (Z) state. When the current state of the cache line is Shared(S), Invalid (I), or Zero-Shared (ZS), the materialization instruction may be accompanied by an SNPWrite Instruction to ensure the corresponding cache line, which is shared in other processors' caches, is invalidated.

In the case of a Snoop read request between caches, if the state of the cache line is Zero state or Zero-share state, the state of the cache line is changed to Zero-Share state. Additionally, if the state of the cache line is Zero state or Zero-share state and a Snoop read request is received from another core, the cache line transitions to the Invalidation state. Similarly, in the case of a Snoop write request on a cache line in the Zero-shared state, it can also transition to the Invalidation state.

The cache coherence protocol employed by the disclosed technology is primarily based on the MESI protocol with modifications. However, it can be applied to various protocols such as MOESI, in addition to serving as a foundational model.

FIG. 5 illustrates an example computing system 500. System 500 includes one or more computing devices 510, which may comprise computing devices 5101 through 510k, storage 536, a network 540 and one or more cloud computing systems 550, which may comprise cloud computing systems 5501 through 550p. Computing devices 510 may include computing devices located at a customer location that make use of cloud computing services such as Infrastructure as a Service (IaaS), Platform as a Service (PaaS), and/or Software as a Service (SaaS). For example, if a computing device 510 is located at a business enterprise, computing device 510 may use cloud systems 550 as a service that provides software applications (e.g., accounting, word processing, inventory tracking, etc., applications) to computing devices 510 used in operating enterprise systems.

In addition, computing device 510 may access cloud computing systems 550 as part of its operations that employ machine learning, or more generally artificial intelligence technology, to train applications that support its business enterprise.

As shown in FIG. 5, each of computing devices 510 may include one or more processors 512, memory 516 storing data 534 and instructions 532, display 520, communication interface 524, and input system 528. The processors 512 and memories 516 may be communicatively coupled as shown in FIG. 5 and include memory controllers, queues, a prefetch engine, and/or hint table mechanisms described above. Computing device 510 may also be coupled or connected to storage 536, which may comprise local or remote storage, e.g., on a Storage Area Network (SAN), that stores data accumulated as part of a customer's operation. Computing device 510 may comprise a standalone computer (e.g., desktop or laptop) or a server associated with a customer. A given customer may also implement, as part of its business, multiple computing devices as servers. Memory 516 stores information accessible by the one or more processors 512, including instructions 532 and data 534 that may be executed or otherwise used by the processor(s) 512. The memory 516 may be of any type capable of storing information accessible by the processor, including a computing device-readable medium, or other medium that stores data that may be read with the aid of an electronic device, such as a hard drive, memory card, ROM, RAM, DVD, or other optical disks, as well as other write-capable and read-only memories. Systems and methods may include different combinations of the foregoing, whereby different portions of the instructions and data are stored on different types of media.

The instructions 532 may be any set of instructions to be executed directly (such as machine code) or indirectly (such as scripts) by the processor 512. For example, the instructions may be stored as computing device code on the computing device-readable medium. In that regard, the terms "instructions" and "programs" may be used interchangeably herein. The instructions may be stored in object code format for direct processing by the processor, or in any other computing device language, including scripts or collections of independent source code modules that are interpreted on demand or compiled in advance. Processes, functions, methods, and routines of the instructions are explained in more detail below.

The data 534 may be retrieved, stored, or modified by processor 512 in accordance with the instructions 532. As an example, data 534 associated with memory 516 may comprise data used in supporting services for one or more client devices, applications, etc. Such data may include data to support hosting web-based applications, file share services, communication services, gaming, sharing video or audio files, or any other network-based services.

The one or more processors 512 may be any conventional processor, such as commercially available CPUs. Alternatively, the one or more processors may be a dedicated device such as an ASIC, e.g., a tensor processing unit (TPU), or other hardware-based processor. Although FIG. 5 functionally illustrates the processor, memory, and other elements of computing device 510 as being within the same block, it will be understood by those of ordinary skill in the art that the processor, computing device, or memory may actually include multiple processors, computing devices, or memories that may or may not be located or stored within the same physical housing. In one example, one or more computing devices 510 may include one or more server computing devices having a plurality of computing devices (e.g., a load-balanced server farm) that exchange information with different nodes of a network for the purpose of receiving, processing, and transmitting the data to and from other computing devices as part of customer's business operation.

Computing device 510 may also include a display 520 (e.g., a monitor having a screen, a touch-screen, a projector, a television, or other device that is operable to display information) that provides a user interface that allows for controlling the computing device 510. Such control may include, for example, using a computing device to cause data to be uploaded through input system 525 to cloud system 550 for processing, causing accumulation of data on storage 536, or more generally, managing different aspects of a customer's computing system. While input system 525 may be used to upload data, e.g., a USB port, computing system 500 may also include a mouse, keyboard, touchscreen, or microphone that can be used to receive commands and/or data.

The network 540 may include various configurations and protocols including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi, HTTP, etc., and various combinations of the foregoing. Such communication may be facilitated by any device capable of transmitting data to and from other computing devices, such as modems and wireless interfaces. Computing device 510 interfaces with network 540 through communication interface 524, which may include the hardware, drivers, and software necessary to support a given communications protocol.

Cloud computing systems 550 may comprise one or more data centers that may be linked via high speed communications or computing networks. A given data center within system 550 may comprise dedicated space within a building that houses computing systems and their associated components, e.g., storage systems and communication systems. Typically, a data center will include racks of communication equipment, servers/hosts, and disks. The servers/hosts and disks comprise physical computing resources that are used to provide virtual computing resources such as VMs. To the extent that a given cloud computing system includes more than one data center, those data centers may be at different geographic locations within relative close proximity to each other, chosen to deliver services in a timely and economically efficient manner, as well as provide redundancy and maintain high availability. Similarly, different cloud computing systems are typically provided at different geographic locations.

As shown in FIG. 5, computing system 550 may include infrastructure 552, storage 554 and computer system 558. Infrastructure 552, storage 554 and computer system 558 may comprise a data center within a cloud computing system 550. Infrastructure 552 may comprise servers, switches, physical links (e.g., fiber), and other equipment used to interconnect servers within a data center with storage 554 and computer system 558. The servers may be equipped with the components that make up computing device 500 or 510. Storage 554 may comprise a disk or other storage device that is partitionable to provide physical or virtual storage to virtual machines running on processing devices within a data center. Storage 554 may be provided as a SAN within the datacenter hosting the virtual machines supported by storage 554 or in a different data center that does not share a physical location with the virtual machines it supports. Computer system 558 acts as supervisor or managing agent for jobs being processed by a given data center. In general, computer system 558 will contain the instructions necessary to, for example, manage the operations requested as part of a synchronous training operation on customer data. Computer system 558 may receive jobs, for example, as a result of input received via an application programming interface (API) from a customer.

Aspects of the disclosure may take the form of a method, process, apparatus, or system that includes the following combination and sub-combination of features:

Although the subject matter herein has been described with reference to particular embodiments, it is to be understood that these embodiments are merely illustrative of the principles and applications. It is therefore to be understood that numerous modifications may be made to the illustrative examples and that other arrangements may be devised without departing from the spirit and scope of the subject matter as defined by the appended claims.

The invention claimed is:

1. A method for operating a cache within a computer system comprising a plurality of processors, the method comprising:
    executing, at a first processor, an application;
    identifying a memory range that will be used by the application;
    receiving, at the first processor, an instruction from the application, wherein the instruction is an invalidation request or a materialization request for a specific cache line, and the instruction is associated with the memory range identified for the application; and
    when the instruction is an invalidation request, marking by the first processor a state of the specific cache line as invalid and a candidate for eviction; and
    when the instruction is a materialization request, allocating by the first processor a cache line and setting the state of the specific cache line to a zero state, wherein when the state of the specific cache line is the zero state, a copy of the specific cache line in a second processor is invalidated.

2. The method of claim 1, wherein when the specific cache line with the zero state receives a snoop read request from the second processor, setting the state of the specific cache line to a zero-shared state.

3. The method of claim 1, further comprising identifying the state of the specific cache line, wherein identifying the state of the specific cache line further comprises reading dirty bits and cache coherence protocol state of the specific cache line.

4. The method of claim 1, wherein the invalidation request is received from the application when a lifetime of the memory block terminates.

5. The method of claim 1, wherein the materialization request is received from the application when a previous value is no longer needed.

6. The method of claim 1, wherein the instruction is executed along with a memory allocation operation.

7. The method of claim 1, wherein the instruction follows Modified Exclusive Shared Invalid (MESI) or Modified Owned Exclusive Shared Invalid (MOESI) coherence protocol.

8. The method of claim 1, the specific cache line is determined based on a memory access region of the application.

9. A computer system comprising:
    a main memory;
    a plurality of caches operably connected to the main memory;

one or more processors, operably connected to the main memory and the plurality of caches, a first processor configured to:

executing an application;

identifying a memory range that will be used by the application;

receive an instruction from the application, wherein the instruction is an invalidation request or a materialization request for a specific cache line, and the instruction is associated with the memory range identified for the application; and when the instruction is an invalidation request, mark a state of the specific cache line as invalid and marking the cache line for eviction, and when the instruction is a materialization request, allocate a cache line and set the state of the specific cache line to a zero state, wherein when the state of the specific cache line is the zero state, a copy of the specific cache line in a second processor is invalidated.

10. The computer system of claim 9, wherein when the specific cache line with the zero state receives a snoop read request from the second processor, setting the state of the specific cache line to a zero-shared state.

11. The computer system of claim 9, the one or more processors operably connected to the main memory and the plurality of caches configured to identify the state of the specific cache line, wherein identifying the state of the specific cache line further comprises reading dirty bits and cache coherence protocol state of the specific cache line.

12. The computer system of claim 9, wherein the invalidation request is received from the application when a lifetime of the memory block terminates.

13. The computer system of claim 9, wherein the materialization request is received from the application when a previous value is no longer needed.

14. The computer system of claim 9, wherein the instruction is executed along with a memory allocation operation.

15. The computer system of claim 9, wherein the instruction follows Modified Exclusive Shared Invalid (MESI) or Modified Owned Exclusive Shared Invalid (MOESI) coherence protocol.

16. The computer system of claim 9, the specific cache line is determined based on a memory access region of the application.

17. The computer system of claim 9, wherein the plurality of caches include L1 cache, L2 cache, and shared cache, interconnected by a bus.

18. One or more non-transitory computing device-readable media comprising instructions, that when executed by one or more processors of one or more computing devices, cause the one or more processors to perform operations comprising:

executing, at a first processor, an application;

identifying a memory range that will be used by the application;

receiving, at the first processor of the one or more processors, an instruction from the application, wherein the instruction is an invalidation request or a materialization request for a specific cache line, and the instruction is associated with the memory range identified for the application; and when the instruction is an invalidation request, marking by the first processor a state of the specific cache line as invalid and marking the cache line for eviction; and when the instruction is a materialization request, allocating by the first processor a cache line and setting the state of the specific cache line to a zero state, wherein when the state of the specific cache line is the zero state, a copy of the specific cache line in a second processor is invalidated.

* * * * *